(12) United States Patent
Shimizu

(10) Patent No.: US 8,774,566 B2
(45) Date of Patent: *Jul. 8, 2014

(54) OPTICAL WAVEGUIDE ELEMENT MODULE

(75) Inventor: Ryo Shimizu, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 175 days.

This patent is subject to a terminal disclaimer.

(21) Appl. No.: 13/497,643

(22) PCT Filed: Sep. 24, 2010

(86) PCT No.: PCT/JP2010/066517
§ 371 (c)(1),
(2), (4) Date: May 11, 2012

(87) PCT Pub. No.: WO2011/037171
PCT Pub. Date: Mar. 31, 2011

(65) Prior Publication Data
US 2012/0301070 A1  Nov. 29, 2012

(30) Foreign Application Priority Data

Sep. 25, 2009  (JP) ................ 2009-221404

(51) Int. Cl.
G02F 1/035  (2006.01)
G02B 26/00  (2006.01)

(52) U.S. Cl.
USPC ............................................. 385/2; 359/237

(58) Field of Classification Search
USPC .................................................. 385/2
See application file for complete search history.

(56) References Cited

U.S. PATENT DOCUMENTS

| 5,408,566 A | 4/1995 | Eda et al. |
| 2003/0091258 A1 | 5/2003 | Uesaka et al. |
| 2003/0151793 A1* | 8/2003 | Sugiyama et al. ............ 359/279 |
| 2007/0003180 A1* | 1/2007 | Tanaka et al. .................... 385/2 |
| 2010/0027934 A1 | 2/2010 | Shimizu et al. |
| 2010/0158428 A1 | 6/2010 | Kawano et al. |

FOREIGN PATENT DOCUMENTS

| JP | 2-129767 U | 10/1990 |
| JP | 6-289341 A | 10/1994 |
| JP | 3088988 B2 | 7/2000 |
| JP | 2003-140099 A | 5/2003 |
| JP | 2004-318113 A | 11/2004 |
| JP | 2004318113 | * 11/2004 | ............ G02F 1/035 |
| JP | 2007-10942 A | 1/2007 |
| JP | 2007-134385 A | 5/2007 |
| JP | 2008-83449 A | 4/2008 |
| WO | 2007/145144 A1 | 12/2007 |

* cited by examiner

Primary Examiner — Uyen Chau N Le
Assistant Examiner — Kajli Prince
(74) Attorney, Agent, or Firm — Taft Stettinius & Hollister LLP

(57) ABSTRACT

An optical waveguide element module includes an optical waveguide formed on a substrate, an optical waveguide element having a modulation electrode for modulating an optical wave propagating through the optical waveguide, a connector where an external signal line for inputting a modulation signal into the modulation electrode is connected, and a relay line formed on a relay substrate to connect the connector and the modulation electrode. The relay line is a coplanar-type line, in which a signal electrode is interposed between ground electrodes. The impedance of the relay line changes stepwise or continuously so as to suppress reflection of the modulation signal in the optical waveguide element module. A filter circuit including a capacitor is arranged in the middle of the relay line.

8 Claims, 10 Drawing Sheets

OPTICAL WAVEGUIDE ELEMENT MODULE

BACKGROUND OF THE INVENTION

1. Field of the Invention

This application is the U.S. National Stage of PCT/JP2010/066517 filed Sep. 24, 2010, claiming priority of Japan Patent App. No. 2009-221404 filed Sep. 25, 2009, and the contents of said PCT application and said priority application are hereby incorporated by reference herein, in their entirety. The present invention relates to an optical waveguide element module, and more particularly, to an optical waveguide element module including a connector where an external signal line for inputting a modulation signal into a modulation electrode of the optical waveguide element is connected, a relay substrate for connecting modulation electrodes of the optical waveguide element and the connector, and the relay substrate having a relay line and a filter circuit on the relay substrate.

2. Description of Related Art

In the fields of optical communication or optical measurement of the related art, an optical waveguide element, where an optical waveguide is formed on a substrate, such as an optical modulator, is widely used as means for controlling the optical wave.

Such an optical waveguide element is provided with a modulation electrode for modulating the optical wave propagating through the optical waveguide, and the modulation signal is input to the modulation electrode using the connector connected to the external signal line. For this reason, in order to efficiently input the modulation signal to the modulation electrode from the external signal line, it is necessary to achieve an impedance matching between the external signal line and the modulation electrode and prevent reflection of the modulation signal in the transmission line.

FIG. 1 is a diagram illustrating an example of the optical waveguide element module. The optical waveguide element includes an optical waveguide 2 formed on the substrate 1 made of a material having an electro-optic effect or the like, a modulation electrode 3 for modulating the optical wave propagating through the optical waveguide 2 (as to the modulation electrodes, there are a signal electrode and a ground electrode; but, FIG. 1 only illustrates an arrangement of the signal electrode for simplicity), and the like. An input optical fiber 4 for inputting the optical wave and an output optical fiber 5 for outputting the modulated optical wave are connected to the optical waveguide element. The optical waveguide element is housed in a hermetically sealed state within the casing 9 to constitute an optical waveguide element module. The modulation signal from a driver 6 provided in the outer side of the optical waveguide element module is applied via the connector 8 to the modulation electrode 3 of the optical waveguide element.

The impedance from the driver 6 to the connector 8 is typically set to 50Ω. If the impedance of the modulation electrode of the optical waveguide element is 40Ω, reflection of the modulation signal occurs between the connector 8 and the modulation electrode 3 due to impedance mismatching of the transmission line as described above. In order to address such problems, the relay substrate 7 is provided between the connector 8 and the optical waveguide element, and a resistor 11 (in this case, 10Ω resistor) is arranged in the relay substrate 7 as shown in FIG. 2, so that the apparent impedance in the optical waveguide element side as seen from the connector 8 is set to 50Ω.

Although such a method of adjusting the impedance provides a certain effect for reflection suppression of the microwave which is a modulation signal, there is a problem in that the microwave is attenuated by the resistor 11, and it is difficult to effectively apply the modulation signal to the optical waveguide element.

Meanwhile, in recent years, in order to evaluate the optical waveguide element, a so-called jitter characteristic indicating a temporal fluctuation of the optical signal obtained when the optical waveguide element is driven has attracted attention. The jitter is an index indicating a temporal fluctuation of the optical signal and is defined as a width of crossing points of the signal obtained by integrating the optical eye-pattern waveforms.

In order to improve the jitter of the optical signal obtained by driving the optical waveguide element, it is necessary to improve the characteristics of the optical waveguide element or a driver for driving and controlling the optical waveguide element as follows.

(1) Driver

In order to amplify the input electric signal without deterioration, the gain is set to have a flat frequency characteristic from a low frequency range to a high frequency range.

(2) Optical Waveguide Element

In order to convert the input electric signal into the optical signal without deterioration, the frequency of the electric/optical conversion response is set to have a flat frequency characteristic from a low frequency range to a high frequency range.

Although the jitter described above does not occur if the frequency characteristic in the driver and the optical waveguide element is infinitely flat (no frequency dependence) as described above, in practice, neither the driver nor the optical modulator have flat frequency characteristics in a low frequency range, and the jitter occurs since a frequency characteristic in the high frequency range tends to deteriorate under the right shoulder. In particular, the occurrence of such jitter becomes an important issue in the optical waveguide element having a transmission speed of a gigahertz order.

As a method of flattening the response characteristics of the electric signal applied to the optical waveguide element and the optical wave output from the optical waveguide element, there is known a method of applying the modulation signal of the driver 106 to the modulation electrode 103 of the optical waveguide element via the relay substrate 107 such as the filter circuit, or a method of connecting the termination circuit 108 such as a terminal resistor to a termination portion of the modulation electrode 103 as shown in FIG. 3. The optical waveguide element of FIG. 3 is obtained by forming the optical waveguide 102 on the substrate 101 made of a material having an electro-optic effect and the like and forming the modulation electrode 103 for modulating the optical wave propagating through the optical waveguide 102 (while the modulation electrode includes a signal electrode and a ground electrode, only an arrangement of the signal electrode is illustrated in FIG. 3 for the purpose of brevity). In addition, the input optical fiber 104 or the output optical fiber 105 is connected to the optical waveguide element, which is responsible for incidence of the optical wave to the optical waveguide element and emission of the optical wave from the optical waveguide element.

The optical waveguide element is housed in a single casing 109 along with a relay substrate 107, a termination circuit 108, or the like.

As a technique of using the termination circuit, there is known a method of improving the frequency characteristic of the optical modulator by adjusting the impedance of the termination portion of the modulation electrode of the optical modulator as disclosed in JP-B-3088988.

However, it is difficult to flatten the frequency characteristic up to the high frequency range that allows for several tens of Gbps transmission only using the termination circuit. It is also difficult to change the frequency to be adjusted out of the frequency characteristic of the electric/optical conversion response of the traveling-wave type optical modulator only by adjusting the impedance of the termination portion disclosed in JP-B-3088988.

A technique of using the relay substrate having a filter circuit is disclosed in JP-A-2007-10942 or JP-A-2008-83449. In order to flatten the frequency characteristic of the electric/optical response, a high pass filter obtained by connecting a capacitor 110 and a resistor 111 in parallel as shown in FIG. 4 is used as a basic configuration of the filter circuit. The reference numerals 112 and 113 of FIG. 4 denote electric lines of the relay substrate, and the reference numeral 107 denotes the relay substrate including the filter circuit.

In particular, JP-A-2007-10942 discloses a technique in which the capacitor or resistor of the filter circuit on the relay substrate is configured by a plurality of thin films on the electric line.

While a circuit configuration using such a thin film contributes to the miniaturization of the filter circuit, the manufacturing process becomes complicated, and in particular, a number of processes for forming and removing thin film are necessary to configure the capacitor using the thin film. In addition, although it is necessary to adjust the value of the capacitor or the resistor depending on the frequency characteristic of the optical waveguide element, it is possible to easily adjust the value of the resistor through simply trimming a part of thin film. However, it is difficult to adjust the value of the capacitor since the trimming may lead to a short circuit between the electrodes.

The inventors tried to address this problem for the capacitor by using a laminated ceramic capacitor.

Specifically, as shown in FIG. 5, the electric lines 112 and 113 are formed on the relay substrate main body 114, and a chip-type laminated ceramic capacitor 110 is arranged to connect two electric lines. The laminated ceramic capacitor is advantageous in that a capacitor having an extremely small size such as 0.3 mm vertical×0.6 mm horizontal×0.3 mm height (0603 size) can be obtained with low cost.

The laminated ceramic capacitor is formed so that the electrodes 122 and 123 have a comb tooth-shape so as to interpose the ceramic material 124 therebetween as shown in FIG. 6 (illustrating a cross-sectional view of the capacitor), and each electrode is connected to terminals 120 and 121 at both ends.

However, if the laminated ceramic capacitor is used, it was found that the frequency characteristic 130 of the optical response generates the resonance phenomenon (at a resonance frequency $f_0$) as shown in FIG. 7. For this reason, it was considered that the laminated ceramic capacitor is unsuitable for a component of the filter circuit for connecting the optical waveguide element.

Moreover, the inventors also examined a technique of using a single-plate capacitor as the capacitor.

Specifically, as shown in FIG. 8, the electric lines 212 and 213 are formed on the relay substrate main body 214, and the single-plate capacitor 210 is arranged on one of the electric lines 212. In order to arrange the single-plate capacitor in the electric line, a conductive wire 220 such as a gold line is connected such that the electrode of the lower surface of the single-plate capacitor is electrically connected to the electric line 212, and the electrode of the upper surface of the single-plate capacitor is electrically connected to the electric line 213.

In the single-plate capacitor, as shown in FIG. 9 (illustrating a perspective view of a capacitor), the electrodes 215 and 217 are formed so as to interpose a dielectric material 216 therebetween. A relative dielectric constant $\in_r$ of the dielectric material, a dielectric constant $\in_0$ of vacuum, the area S of the electrodes 215 and 217, a distance d of the electrodes 215 and 217, and an electrostatic capacitance C are expressed by the following formula.

electrostatic capacitance $C=\in_r \cdot \in_0 \cdot S/d$

In general, since the single-plate capacitor has a high frequency characteristic better than that of the laminated ceramic capacitor, the single-plate capacitor is commonly used in devices where a high frequency characteristic is important.

However, since the thickness (distance d of electrodes) is changed in order to change the electrostatic capacitance of the single-plate capacitor having the same size, it is necessary to be careful in regard to the change of the characteristics caused by the thickness of the capacitor.

In particular, in the filter circuit described above, it was found that the resonance phenomenon (resonance frequency $f_0$) generated in the frequency characteristic 130 of the electric/optical response shown in FIG. 7 is generated at a specific frequency range as the thickness of the capacitor becomes thicker, similar to the laminated ceramic capacitor, and a high frequency characteristic is deteriorated.

SUMMARY OF THE INVENTION

The invention has been made to address the problems described above and provide an optical waveguide element module capable of suppressing reflection of the modulation signal and attenuation of the modulation signal even when the impedance of the modulation electrode of the optical waveguide element is different from the impedance of the transmission line used to input the modulation signal from outside the optical waveguide element and capable of flattening the optical response frequency characteristic over a wide range of several tens of GHz even when the filter circuit including a capacitor is arranged on the line used to input the modulation signal to the modulation electrode of the optical waveguide element.

In order to address the aforementioned problems, in a first embodiment of the invention, there is provided an optical waveguide element module including an optical waveguide formed on a substrate; an optical waveguide element having a modulation electrode for modulating an optical wave propagating through the optical waveguide; a connector where an external signal line for inputting a modulation signal into the modulation electrode is connected; and a relay line formed on the relay substrate to connect the connector and the modulation electrode, wherein the relay line is a coplanar-type line in which a signal electrode is interposed between ground electrodes, an impedance of the relay line changes stepwise or continuously so as to suppress reflection of the modulation signal in the optical waveguide element module, and a filter circuit including a capacitor is arranged in the middle of the relay line.

The "optical waveguide element module" in the present invention means that the relay line is connected to the optical waveguide element. As shown in FIG. 1 (or FIG. 3), it is not limited to being housed in a single casing 9 (or 109). In addition, the "relay line" is not limited to a simple signal line only propagating through the modulation signal and includes lines having a circuit which adjusts the modulation signal such as the filter circuit.

In a second embodiment of the invention, in the optical waveguide element module according to the first embodiment, the length of the relay line is not an integer multiple of a quarter of a microwave wavelength which is the modulation signal.

In a third embodiment of the invention, in the optical waveguide element module according to the first embodiment or the second embodiment, the length of the relay line is less than half of the microwave wavelength which is the modulation signal.

According to a fourth aspect of the invention, in the optical waveguide element module according to any one of the first to third aspects, an impedance of the relay line changes stepwise, and the length of the relay line in blocks of each stage may be less than a quarter of a microwave wavelength which is the modulation signal.

According to a fifth aspect of the invention, in the optical waveguide element module according to any one of the first to fourth aspects, a gap of the relay line between the signal electrode and the ground electrode is adjusted to be narrower toward the optical waveguide element side from the connector side.

According to a sixth aspect of the invention, in the optical waveguide element module according to any one of the first to fifth aspects, the dielectric constants of a part of materials arranged around the relay line are adjusted to increase toward the optical waveguide element side from the connector side.

According to a seventh aspect of the invention, in the optical waveguide element module according to any one of the first to sixth aspects, the capacitor is arranged by stacking a plurality of laminated ceramic capacitors on a filter circuit substrate, and each one of the laminated ceramic capacitors has an electrostatic capacitance equal to or lower than 3 pF.

According to an eighth aspect of the invention, in the optical waveguide element module according to the seventh aspect, the filter circuit has an electric resistance caused by a film body formed on the relay substrate, and a laminated ceramic capacitor is arranged to overlap with the electric resistance.

According to a ninth aspect of the invention, in the optical waveguide element module according to any one of the first to sixth aspects, the capacitor is a single-plate capacitor, a distance between electrodes within the capacitor is equal to or shorter than 0.05 mm, a relative dielectric constant of a dielectric material between the electrodes is equal to or lower than 1000, and a resonance frequency caused by the filter circuit is higher than 20 GHz.

According to a tenth aspect of the invention, in the optical waveguide element module according to the ninth aspect, the single-plate capacitor of the filter circuit is arranged such that one of a plurality of electric lines formed in the relay substrate makes contact with an electrode of a lower surface of the single-plate capacitor, and an electrode of an upper surface of the single-plate capacitor is connected to other electric lines through a conductive wire.

According to an eleventh aspect of the invention, in the optical waveguide element module according to any one of the first to tenth aspects, the filter circuit includes an electric resistance caused by a film body formed on a relay substrate.

According to a twelfth aspect of the invention, in the optical waveguide element module according to any one of the first to eleventh aspects, a termination circuit is connected to a terminal portion of the modulation electrode.

According to a first aspect of the invention, an optical waveguide element module includes an optical waveguide formed on a substrate; an optical waveguide element having a modulation electrode for modulating an optical wave propagating through the optical waveguide, a connector where an external signal line for inputting a modulation signal into the modulation electrode is connected; and a relay line formed on the relay substrate to connect the connector and the modulation electrode, wherein the relay line is a coplanar-type line in which a signal electrode is interposed between ground electrodes, an impedance of the relay line changes stepwise or continuously so as to suppress reflection of the modulation signal in the optical waveguide element module, and a filter circuit including a capacitor is arranged in the middle of the relay line so that it is possible to efficiently apply the modulation signal to the modulation electrode and it is possible to suppress a deterioration of the modulation signal in the relay line having the filter circuit.

Moreover, according to the present invention, since the relay line is a coplanar-type line where a signal electrode is interposed between ground electrodes, it is possible to easily adjust the impedance of the relay line, for example, by adjusting an electrode gap between the signal electrode and the ground electrode or the like. It is unnecessary to increase the number of components of the optical waveguide element module and a manufacturing process is not complicated.

According to a second aspect of the invention, since the length of the relay line is not an integer multiple of a quarter of a microwave wavelength used in the modulation signal, generation of the standing wave of the microwave in the relay line is suppressed, and it is possible to suppress reflection of the modulation signal.

According to a third aspect of the invention, since a length of the relay line is less than half of the microwave wavelength used in the modulation signal, generation of the standing wave of the microwave in the relay line is suppressed, and it is possible to suppress reflection of the modulation signal.

According to a fourth aspect of the invention, since an impedance of the relay line changes stepwise, and a length of the relay line in blocks of each stage may be less than a quarter of a microwave wavelength used in the modulation signal, generation of the standing wave of the microwave in blocks of each stage is suppressed, and it is possible to suppress reflection of the modulation signal.

According to a fifth aspect of the invention, since the relay line is adjusted so that a gap between the signal electrode and the ground electrode becomes narrower toward the optical waveguide element side from the connector side, in order to adjust the impedance, it is unnecessary to increase the number of components of the optical waveguide element module and a manufacturing process is not complicated.

According to a sixth aspect of the invention, since dielectric constants of a part of materials arranged around the relay line are adjusted to increase toward the optical waveguide element side from the connector side, for example, it is possible to change the impedance stepwise or continuously without changing the shape and the arrangement of the signal electrode or the ground electrode or making other significant changes.

According to a seventh aspect of the invention, since the capacitor is arranged by stacking a plurality of laminated ceramic capacitors on a filter circuit substrate, and each one of the laminated ceramic capacitors has an electrostatic capacitance equal to or lower than 3 pF, it is possible to flatten the frequency characteristic of the electric/optical response over the range beyond 20 GHz broadband even when the laminated ceramic capacitor is used in the filter circuit. In addition, when a plurality of laminated ceramic capacitors is used, since the laminated ceramic capacitors are stacked and arranged on the filter circuit substrate, the filter circuit substrate does not become bigger, it is possible to easily achieve a parallel circuit of a capacitor, and it is possible to operate effectively even when an electrostatic capacitance larger than 3 pF is necessary.

According to an eighth aspect of the invention, since the filter circuit has an electric resistance caused by a film body formed on the relay substrate, and a laminated ceramic capacitor is arranged to overlap with the electric resistance, it is possible to miniaturize the filter circuit.

According to a ninth aspect of the invention, since the capacitor is a single-plate capacitor, a distance between electrodes within the capacitor is equal to or shorter than 0.05 mm, a relative dielectric constant of a dielectric material between the electrodes is equal to or lower than 1000, and a resonance frequency caused by the filter circuit is higher than 20 GHz, even when the single-plate capacitor is used in the filter circuit, since the relative dielectric constant is low, it is possible to achieve lower electrostatic capacitance while suppressing an increase of the electrode gap d of the capacitor. As a result, it is possible to suppress a deterioration of the electric signal in the filter circuit and a resonance phenomenon in the used frequency range, and it is possible to provide the optical waveguide element module capable of flattening the electric/optical frequency characteristic over a range beyond tens of GHz broadband.

According to a tenth aspect of the invention, since the single-plate capacitor of the filter circuit is arranged such that one of a plurality of electric lines formed in the relay substrate makes contact with an electrode of a lower surface of the single-plate capacitor, and an electrode of an upper surface of the single-plate capacitor is connected to other electric lines through a conductive wire, the electrode of the upper surface of the single-plate capacitor is easily electrically connected to the electric line and a height of the single-plate capacitor used in the present invention may be reduced so that it is possible to prevent the conductive wire from becoming longer. In addition, it is possible to suppress a resonance phenomenon in the used frequency range of the electric/optical response frequency characteristic.

According to an eleventh aspect of the invention, the filter circuit includes an electric resistance caused by a film body formed on the relay substrate, it is possible to miniaturize an electric resistance of the filter circuit and easily adjust a value of resistance through trimming or the like. For this reason, a capacity adjustment of the capacitor may be corresponded by exchanging a capacitor of the laminated ceramic capacitor or the single-plate capacitor, or by using a plurality of laminated ceramic capacitors. It is possible to easily adjust the filter circuit appropriately in each optical waveguide element by performing a trimming or the like for adjustment of the resistance value of the electric resistance.

According to a twelfth aspect of the invention, a termination circuit is connected to a terminal portion of the modulation electrode. Therefore, since the flattening of the electric/optical response frequency may be obtained by combining both the filter circuit and the termination circuit, the flattening adjustment may be obtained for various optical waveguide elements. In addition, it is possible to improve the reflection characteristic (S11 characteristic) of the optical waveguide element using the termination circuit.

DETAILED DESCRIPTION OF THE INVENTION

Hereinafter, the preferable embodiments of the invention will be described in detail.

According to the invention, there is provided an optical waveguide element module including: an optical waveguide formed on a substrate; an optical waveguide element including an optical waveguide element having a modulation electrode for modulating an optical wave propagating through the optical waveguide; a connector where an external signal line for inputting a modulation signal into the modulation electrode is connected; and a relay line formed on the relay substrate to connect the connector and the modulation electrode, wherein the relay line is a coplanar-type line in which a signal electrode is interposed between ground electrodes, an impedance of the relay line changes stepwise or continuously so as to suppress reflection of the modulation signal in the optical waveguide element module, and a filter circuit including a capacitor is arranged in the middle of the relay line.

Impedance of the optical waveguide element module of the present invention is adjusted by adjusting the impedance of the relay line formed on the relay substrate. For this reason, without significantly changing the manufacturing process of the optical waveguide element module of the related art, it is possible to suppress reflection or attenuation of the modulation signal and efficiently apply the modulation signal to the modulation electrode. In addition, even when the filter circuit including a capacitor is formed on the relay substrate, it is possible to provide the optical waveguide element module having an improved optical response frequency characteristic by suppressing the reflection of the modulation signal.

Figure 1:
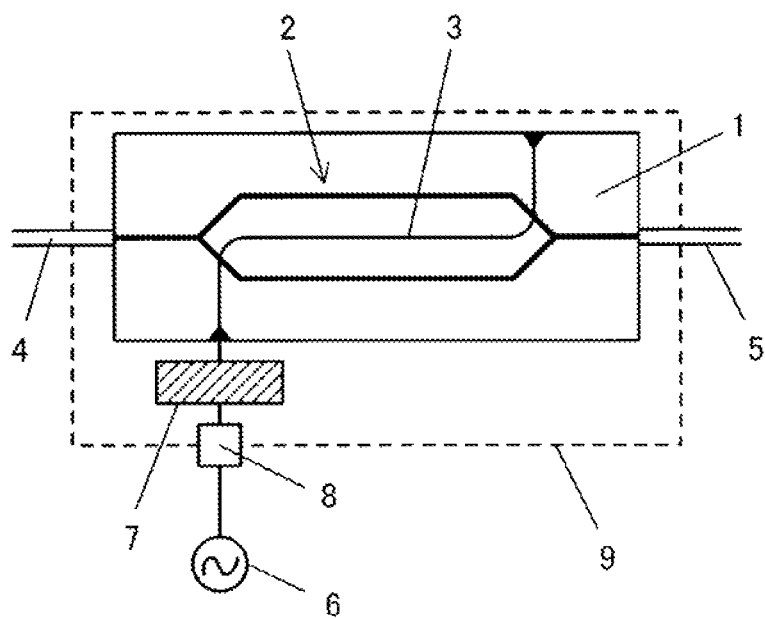
FIG. 1 is a schematic diagram illustrating an optical waveguide element module.
Figure 2:
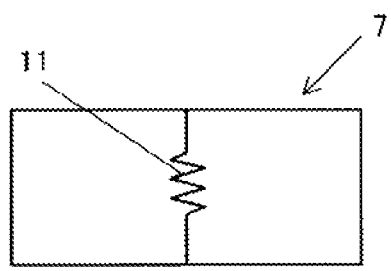
FIG. 2 is a diagram illustrating an example in which the resistor is arranged in the relay substrate.

Since the basic configuration of the present invention is similar to the configuration of FIG. 1 or 3 except for the structure of the relay substrate, description will be made with reference to FIG. 1 or the like as appropriate. Although the following description will be made by focusing on an optical modulator using lithium niobate as an example of the optical waveguide element, it should be noted that the optical waveguide element according to the present invention is not limited to such an optical modulator. For example, the invention may be applied to any optical waveguide element driven by the modulation signal, such as an optical modulator using a semiconductor.

The optical waveguide element according to the invention will be described.

As the substrate 1, various substrates are used depending on a type of the optical waveguide element, such as a substrate having an electro-optic effect or a semiconductor substrate. The substrate having an electro-optic effect may be formed of, for example, a lithium niobate, lithium tantalate, lead lanthanum zirconate titanate (PLZT), and a silica-based material. Specifically, the substrate is configured of an X-cut substrate, a Y-cut substrate, and a Z-cut substrate of a single crystal material thereof. In particular, the substrate is easily configured as an optical waveguide device. Meanwhile, it is desirable to use lithium niobate due to the high anisotropy.

The optical waveguide 2 is a so called Mach-Zehnder type optical waveguide and may be formed by diffusing, for example, titanium (Ti) or the like on the substrate surface using a thermal diffusion method or a proton-exchange method on the substrate 1. As another method, as shown in JP-A-6-289341, it may be possible to configure the optical waveguide by forming a ridge structure in the part corresponding to the optical waveguide. Further, it may be possible to combine the method using aforementioned Ti or the like with the ridge structure.

In order to modulate the optical wave propagating through the optical waveguide 2, the modulation electrode is arranged in the upper side of or in the vicinity of the optical waveguide 2 as necessary.

The modulation electrode may be formed on the front or rear surface or the like of the substrate 1 by forming an electrode pattern of Ti or Au through a gold-plating method and the like. In addition, the modulation electrode includes a signal electrode 3 where the modulation signal (AC signal or DC signal) propagates and a ground electrode arranged in the vicinity of the signal electrode.

Moreover, although not shown in the drawings, a buffer layer such as $SiO_2$ may be formed between the substrate 1 and the aforementioned modulation electrode. As a result, it is possible to effectively prevent the optical wave propagating through the optical waveguide from being absorbed or scattered by the modulation electrode. In addition, the buffer layer contributes to velocity matching between the modulation signal applied from the modulation electrode and the optical wave guided by the optical waveguide.

Figure 10:
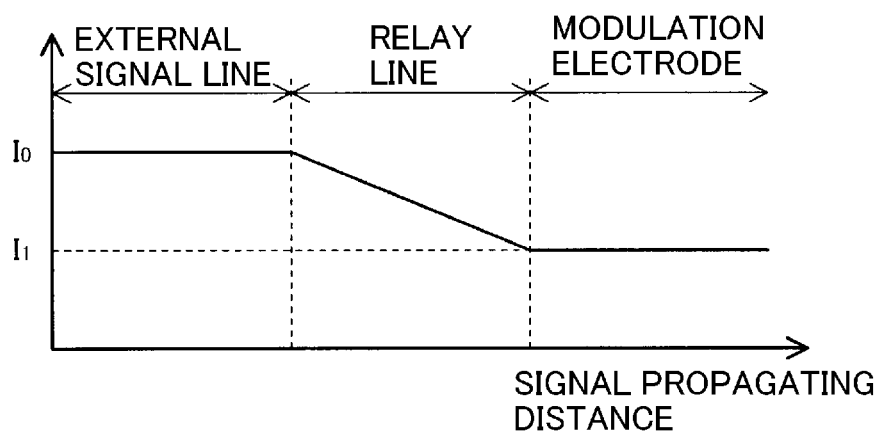
FIG. 10 is a diagram illustrating the appearance of the relay line and a change of the impedance in front and rear stages thereof.

The optical waveguide element module according to the invention adjusts the impedance of the relay line formed on the relay substrate continuously or stepwise as shown in FIG. 10 and suppresses reflection of the modulation signal caused by mismatching between the impedance $I_0$ of the external signal line and the impedance $I_1$ of the modulation electrode. In addition, an external signal line refers to the transmission line of the driver 6 side from the connector 8 of FIG. 1, and a relay line refers to the transmission line formed on the relay substrate 7 of FIG. 1.

Figure 11:
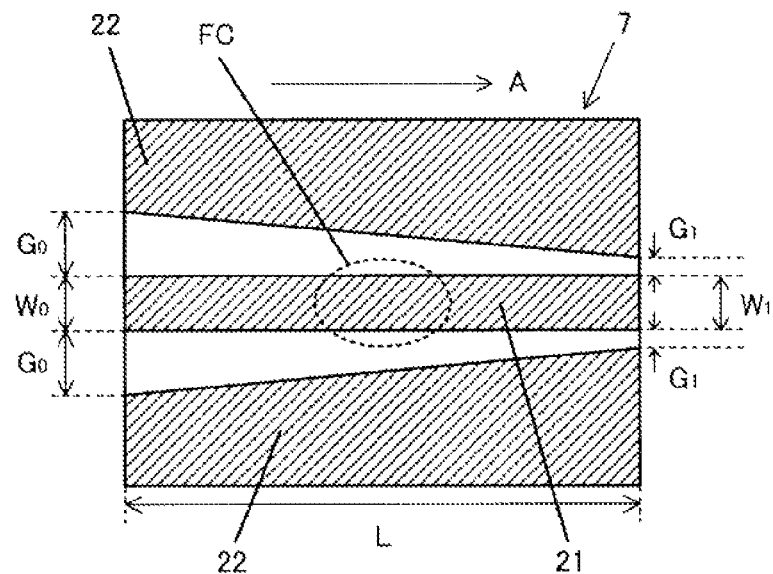
FIG. 11 is a diagram illustrating the relay substrate according to the first embodiment of the invention.
Figure 12:
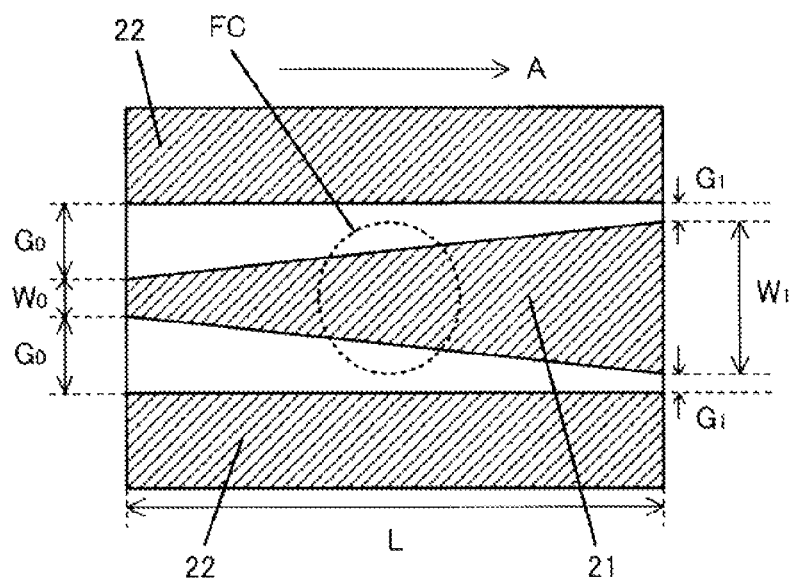
FIG. 12 is a diagram illustrating the relay substrate according to the second embodiment of the invention.
Figure 13:
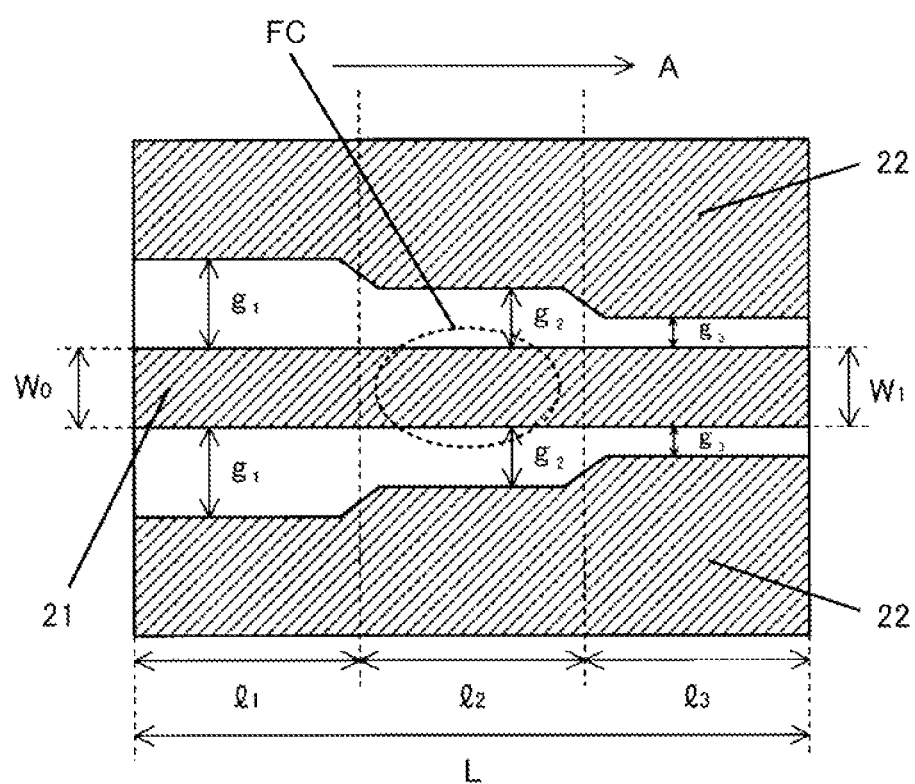
FIG. 13 is a diagram illustrating the relay substrate according to the third embodiment of the invention.

As a method of adjusting impedance of the relay line, as shown in FIGS. 11 to 13, the relay line is configured as a coplanar electrode including a signal electrode 21 and a ground electrode 22, and an electrode gap between the signal electrode 21 and the ground electrode 22 is changed continuously or stepwise. In addition, the filter circuit including a capacitor is arranged in the elliptical dotted-line portion denoted by a reference symbol FC in each drawing. A configuration of the filter circuit will be described below.

In FIG. 11, a width $W_0$ of the input side and a width $W_1$ of the output side of the signal electrode 21 are set to have the same width, and an electrode gap $G_1$ of the output side is set to be narrower than an electrode gap $G_0$ of the input side. In addition, the arrow A indicates a propagation direction of the modulation signal.

In FIG. 12, a width $W_1$ of the output side of the signal electrode 21 is set to be larger than a width $W_0$ of the input side while maintaining a constant gap between two ground electrodes 22. As a result, the electrode gap $G_1$ of the output side becomes narrower than an electrode gap $G_0$ of the input side. The configurations of FIGS. 11 and 12 may be combined such that a gap between two ground electrodes 22 is gradually narrowed as shown in FIG. 11, and a width of the signal electrode 21 gradually increases as shown in FIG. 12.

If microwaves serving as a modulation signal in the relay line form a standing wave, the likelihood that the microwave will be reflected in the relay line is increased. In order to avoid such a problem, it is possible to suppress generation of the standing wave of the microwave in the relay line by setting the length L of the relay line not to be an integer multiple of a quarter of the microwave wavelength or setting it to be smaller than half of the microwave wavelength.

Next, as shown in FIG. 13, the impedance of the relay line may be changed stepwise. In FIG. 13, a width $W_0$ of the input side of the signal electrode 21 and a width $W_1$ of the output side are set to be equal, and electrode gaps ($g_1$ to $g_3$) between the signal electrode 21 and the ground electrode 22 gradually decrease toward the output side from the input side. Although the width of the signal electrode is set to be constant in FIG. 13, the width of the signal electrode may be changed continuously or increase stepwise as shown in FIG. 12.

If the impedance is stepwise changed as shown in FIG. 13, the lengths $l_1$ to $l_3$ of the relay lines in blocks of each stage are set to be smaller than a quarter of a microwave wavelength serving as the modulation signal so that it is possible to suppress the microwaves in the relay line from generating a standing wave and suppress reflection of the modulation signal in inner side of the relay line of blocks configuring each stage.

Figure 14A:
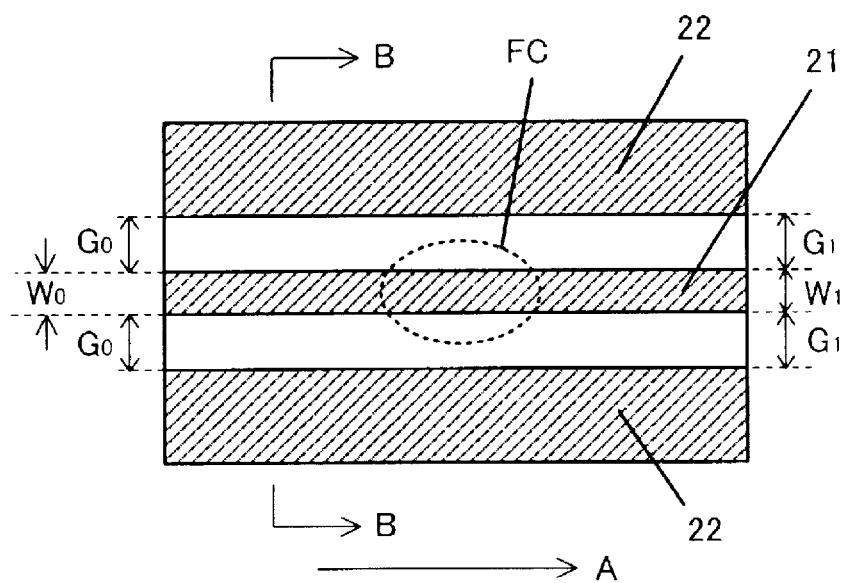
FIG. 14 is a diagram illustrating the relay substrate according to the fourth embodiment of the invention.
Figure 14B:
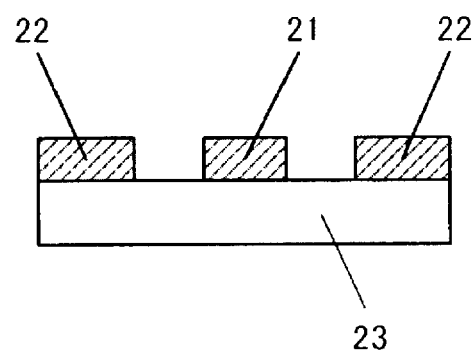

Moreover, as a method of changing the impedance of the relay line, as shown in FIG. 14A, the widths $w_0$ and $w_1$ of the signal electrode 21 or gaps $G_0$ and $G_1$ between the signal electrode 21 and the ground electrode 22 may be constant, and a dielectric constant of a part of the material arranged around the relay line may be adjusted to increase toward the optical waveguide element side from the connector side. Specifically, as shown in FIG. 14B which is a cross-sectional view taken along the line B-B of FIG. 14A, a dielectric constant may be changed by stepwise changing a material of the base plate 23 of the relay substrate and the like. In addition, although not shown in the drawings, the dielectric constant may be adjusted by arranging a dielectric material to cover a gap between the signal electrode 21 and the ground electrode and a part of the signal electrode 21 and the ground electrode so that films having different dielectric constants are stepwise formed along the signal electrode.

In FIGS. 10 to 14, although the impedance of the relay line decreases stepwise or continuously toward the optical waveguide element side, it is needless to say that the impedance of the relay line may be changed to increase conversely toward the optical waveguide element side if the impedance of the modulation electrode of the optical waveguide element is higher than the impedance of the external signal line.

Moreover, in the embodiment of FIGS. 11 to 14, although description is focused on the method of adjusting the impedance of the relay line, a filter circuit including a capacitor is arranged in the elliptical dotted line portions denoted by the reference sign FC in each drawing.

Next, a capacitor used in the filter circuit will be described.

Figure 5:
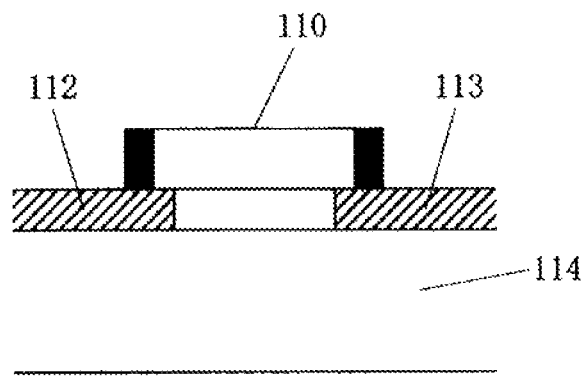
FIG. 5 is a diagram illustrating the laminated ceramic capacitor arranged in the filter circuit.

In the optical waveguide element module according to the present invention, the laminated ceramic capacitor 110 may be arranged as a capacitor as shown in FIG. 5. Electric lines 112 and 113 are formed on the relay substrate main body 114, and the laminated ceramic capacitor chip is arranged to electrically connect both electric lines 112 and 113. As an example of the electric lines 112 and 113, the signal electrode 21 described in FIGS. 11 to 14 may be cut in the middle.

Figure 6:
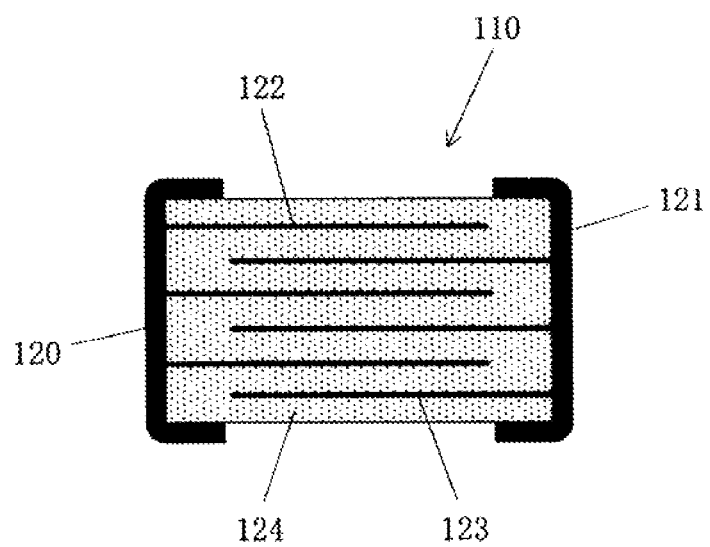
FIG. 6 is a cross-sectional view illustrating a laminated ceramic capacitor.
Figure 7:
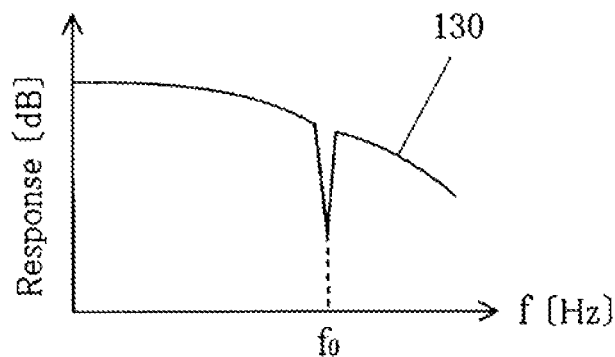
FIG. 7 is a diagram illustrating an electric/optical response frequency characteristic when the laminated ceramic capacitor is used in the filter circuit.

The inventor's intensive research revealed that the resonance is generated due to the comb tooth-shaped electrodes as shown in FIG. 6, and the resonance frequency $f_0$ of FIG. 7 changes depending on the electrostatic capacitance of the capacitor. Particularly, it was found that the resonance frequency $f_0$ tends to decrease as the electrostatic capacitance increases, and this contributed to the completion of the present invention.

Therefore, it is necessary that the laminated ceramic capacitor arranged in the filter circuit has a capacitance equal to or lower than 3 pF. It is recognized that generation of the resonance frequency in the electric/optical response frequency characteristic as shown in FIG. 7 may be shifted to $f_0$=25 GHz by using the laminated ceramic capacitor having such an electrostatic capacitance.

Figure 15:
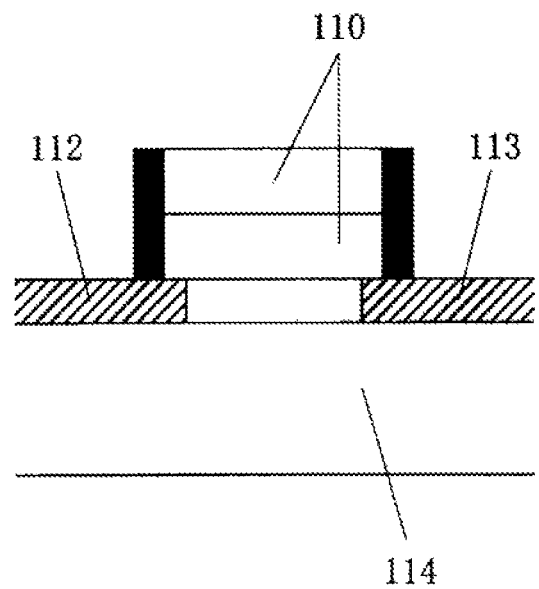
FIG. 15 is a diagram illustrating the appearance of the stacked laminated ceramic capacitors.

Furthermore, it is desirable that a plurality of laminated ceramic capacitors be used to obtain an electrostatic capacitance higher than 3 pF. In this case, it is possible to easily implement a parallel capacitor circuit without increasing the size of the filter circuit substrate by stacking and arranging the laminated ceramic capacitors 110 on the relay substrate 114 as shown in FIG. 15.

Moreover, it is possible to shift the resonance frequency toward a higher frequency and improve the high frequency characteristic by stacking the laminated ceramic capacitors. For example, although the resonance frequency is 30 GHz when a single capacitor of 2 pF is mounted, the resonance frequency is shifted to 45 GHz which is a resonance frequency of 1 pF when two capacitors of 1 pF are stacked.

In order to configure the electric resistance in the filter circuit, a chip type resistor similar to a capacitor may be used. However, as shown in JP-A-2007-10942, the electric resistance using a film body such as $Ti_2N$ formed on the substrate 114 may also be used. The electric resistance of such a film body can reduce the size of the electric resistance of the filter circuit and the resistor value can be easily adjusted through trimming or the like.

Figure 16:
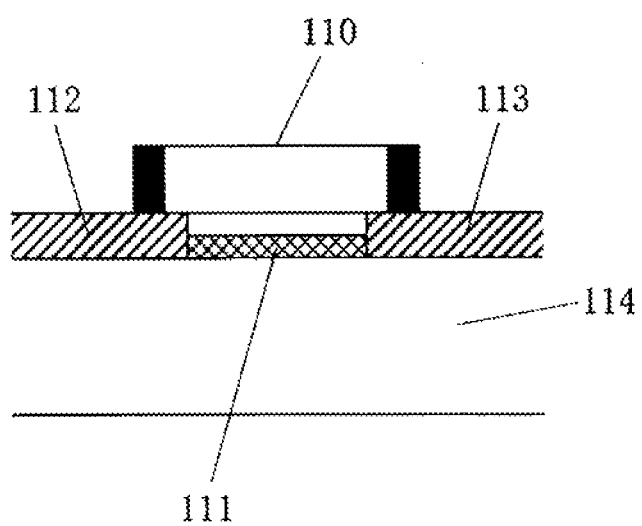
FIG. 16 is a diagram illustrating the appearance when the laminated ceramic capacitor is arranged over the electric resistance of the film body.

Moreover, as shown in FIG. 16, the size of filter circuit can be made smaller by stacking and arranging the laminated ceramic capacitor 110 in the electric resistance 111 of the film body.

Next, description of the experimental example will be made for a change of the frequency characteristic of the electric/optical conversion response regarding the optical waveguide element module according to the present invention.

Figure 4:
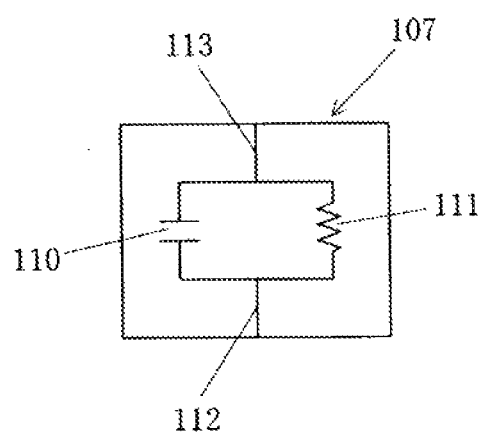
FIG. 4 is a diagram illustrating an example of the filter circuit.

Using an LN modulator (manufactured by Sumitomo Osaka Cement Inc., T.MXH1.5-10) as an optical waveguide element, a high-pass filter shown in FIG. 4 was provided between the input interface and the modulation electrode.

As a capacitor of the high-pass filter, the laminated ceramic capacitors (manufactured by Matsushita Electric Industrial, Inc., ECD series 0603 size) of electrostatic capacitances 1 pF, 2 pF and 3 pF were used. A resistor was formed between electric lines in a thin film of $Ti_2N$, and a resistance value was approximately 10Ω.

The frequency characteristic of the electric/optical conversion response is measured using an optical component analyzer (manufactured by Agilent Inc., 86030A), and a resonance frequency $f_0$ was measured. The resonance frequency $f_0$ was 25 GHz for 3 pF, 30 GHz for 2 pF, and 45 GHz for 1 pF.

As a result, it can be easily understood that the flattening of the electric/optical response frequency characteristic expands to equal to or more than 20 GHz by using a capacitor having a capacitance equal to or smaller than 3 pF when the laminated ceramic capacitor is used.

Figure 8:
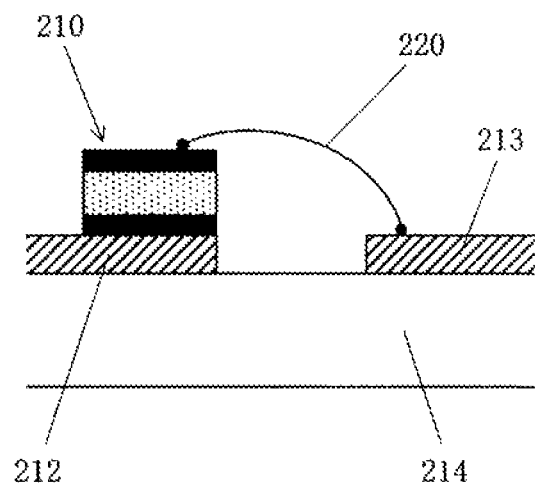
FIG. 8 is a diagram illustrating a single-plate capacitor arranged in the filter circuit.
Figure 9:
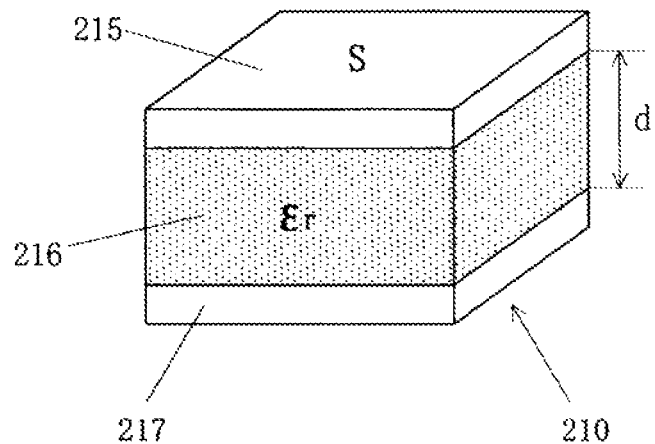
FIG. 9 is a perspective view illustrating a single-plate capacitor.

Next, the single-plate capacitor 210 is arranged as shown in FIG. 8 as a capacitor. The electric lines 212 and 213 are formed on the relay substrate main body 214, and the electrode of the lower surface of the single-plate capacitor 210 is electrically connected to the electric line 212, and the electrode of the upper surface of the single-plate capacitor 210 is electrically connected to the electric line 213 by a conductive wire 220 such as a golden wire. As an example of the electric lines 212 and 213, the signal electrode 21 cut in the middle as described in FIGS. 11 to 14 may be used.

In the single-plate capacitor arranged in the filter circuit, it is possible to suppress a distance d between electrodes to be equal to or smaller than 0.05 mm if the electrode area S is approximately 0.04 to 0.2 $mm^2$ by selecting a dielectric material having a relative dielectric constant of the capacitor equal to or lower than 1000. Therefore, it is also possible to suppress the resonance frequency from being equal to or lower than 20 GHz. In addition, it is possible to implement the electrostatic capacitance C equal to or smaller than 3 pF. It is possible to implement a high-pass filter capable of effectively passing a signal frequency equal to or higher than about 25 GHz by using such a single-plate capacitor.

In order to configure the electric resistance in the filter circuit, a chip type resistor may also be used. However, as disclosed in JP-A-2007-10942, the electric resistance using a film body such as $Ti_2N$ formed on the substrate 214 may also be used. The electric resistance using such a film body can enable miniaturization of the electric resistance in the filter circuit and allow the resistance value to be easily adjusted through trimming or the like.

Figure 17:
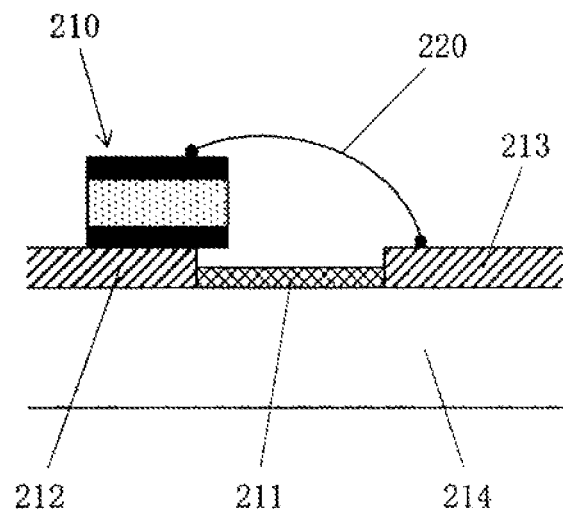
FIG. 17 is a diagram illustrating the appearance of a filter circuit using the single-plate capacitor and the electric resistance of the film body.

In addition, as shown in FIG. 17, if a thickness of the film body resistance is thinner than a thickness of the electric line, the single-plate capacitor 210 may be arranged so as to project in the electric resistance 211 side, and a length of the conductive wire which connects the electrode of the upper surface of the single-plate capacitor and the electric line 213 may be shortened. Similarly, even when there is no film body resistance of FIG. 3, the single-plate capacitor may be arranged so as to project from the electric line 212.

Figure 3:
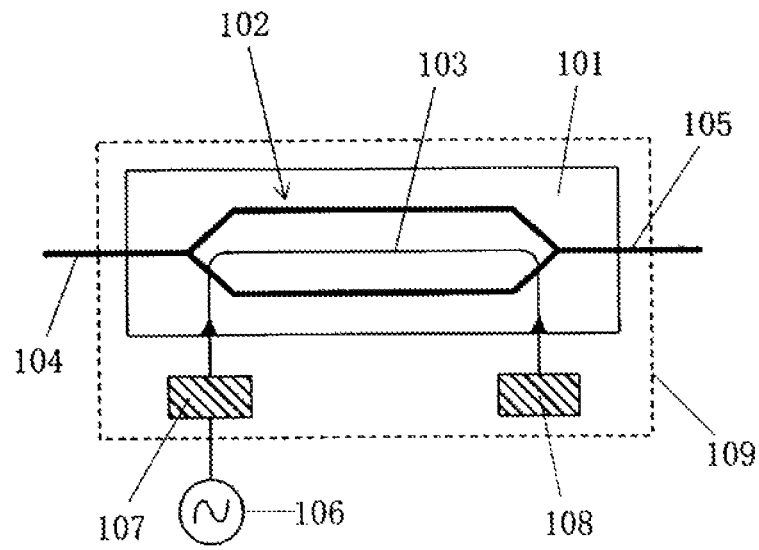
FIG. 3 is a schematic diagram illustrating another example of the optical waveguide element module.

In the optical waveguide element module according to the present invention, in addition to the filter circuit including a capacitor, the termination circuit 108 may be connected to the terminal portion of the modulation electrode as shown in FIG. 3. Therefore, as disclosed in JP-B-3088988, JP-A-2007-10942, and JP-A-2008-83449, it is possible to improve the flattening effect of the electric/optical response frequency of the termination circuit or the reflection characteristic (S11 characteristic) of the optical waveguide element can be expected. In particular, a synergy in combination with the filter circuit of the invention can be expected.

As described above, according to the present invention, even when the impedance of the modulation electrode of the optical waveguide element is different from the impedance of the transmission line used to input the modulation signal from the outer side of the optical waveguide element, it is possible to suppress reflection of the modulation signal and an attenuation of the modulation signal. In addition, even when the filter circuit including a capacitor is arranged on the line used to input the modulation signal to the modulation electrode of the optical waveguide element, it is possible to provide the optical waveguide element module capable of flattening the optical response frequency characteristic over a wide range of several tens of GHz.

What claimed is:

1. An optical waveguide element module comprising:
   an optical waveguide formed on a substrate;
   an optical waveguide element having a modulation electrode for modulating an optical wave propagating through the optical waveguide;
   a connector where an external signal line for inputting a modulation signal into the modulation electrode is connected; and
   a relay line formed on a relay substrate to connect the connector and the modulation electrode,
   wherein the relay line is a coplanar-type line, in which a signal electrode is interposed between ground electrodes,
   an impedance of the relay line changes stepwise so as to suppress reflection of the modulation signal in the optical waveguide element module,
   a filter circuit including a capacitor is arranged in a middle of the relay line, and
   a length of the relay line in a block of each stage is less than a quarter of a microwave wavelength used in the modulation signal.

2. The optical waveguide element module according to claim 1, wherein the relay line is adjusted so that a gap between the signal electrode and the ground electrode becomes narrower toward the optical waveguide element side from the connector side.

3. An optical waveguide element module comprising:
   an optical waveguide formed on a substrate;
   an optical waveguide element having a modulation electrode for modulating an optical wave propagating through the optical waveguide;
   a connector where an external signal line for inputting a modulation signal into the modulation electrode is connected; and
   a relay line formed on a relay substrate to connect the connector and the modulation electrode,
   wherein the relay line is a coplanar-type line, in which a signal electrode is interposed between ground electrodes,
   an impedance of the relay line changes stepwise or continuously so as to suppress reflection of the modulation signal in the optical waveguide element module,
   a filter circuit including a capacitor is arranged in a middle of the relay line,
   the capacitor is arranged by stacking a plurality of laminated ceramic capacitors on a filter circuit substrate, and
   each one of the laminated ceramic capacitors has an electrostatic capacitance equal to or lower than 3 pF.

4. The optical waveguide element module according to claim 3, wherein the filter circuit has an electric resistor formed by a film body formed on the relay substrate, and at least one of the laminated ceramic capacitors is arranged to overlap with the electric resistor.

5. An optical waveguide element module comprising:
   an optical waveguide formed on a substrate;
   an optical waveguide element having a modulation electrode for modulating an optical wave propagating through the optical waveguide;
   a connector where an external signal line for inputting a modulation signal into the modulation electrode is connected; and
   a relay line formed on a relay substrate to connect the connector and the modulation electrode,
   wherein the relay line is a coplanar-type line, in which a signal electrode is interposed between ground electrodes,
   an impedance of the relay line changes stepwise or continuously so as to suppress reflection of the modulation signal in the optical waveguide element module,
   a filter circuit including a capacitor is arranged in a middle of the relay line,
   the capacitor is a single-plate capacitor,
   a distance between electrodes within the capacitor is equal to or shorter than 0.05 mm,
   a relative dielectric constant of a dielectric material between the electrodes within the capacitor is equal to or lower than 1000, and
   a resonance frequency caused by the filter circuit is higher than 20 GHz.

6. The optical waveguide element module according to claim 5, wherein the single-plate capacitor of the filter circuit is arranged such that one of a plurality of electric lines formed in the relay substrate makes contact with an electrode of a lower surface of the single-plate capacitor, and an electrode of an upper surface of the single-plate capacitor is connected to other electric lines through a conductive wire.

7. An optical waveguide element module comprising:
   an optical waveguide formed on a substrate;
   an optical waveguide element having a modulation electrode for modulating an optical wave propagating through the optical waveguide;
   a connector where an external signal line for inputting a modulation signal into the modulation electrode is connected; and
   a relay line formed on a relay substrate to connect the connector and the modulation electrode,
   wherein the relay line is a coplanar-type line, in which a signal electrode is interposed between ground electrodes,
   an impedance of the relay line changes stepwise so as to suppress reflection of the modulation signal in the optical waveguide element module,
   a filter circuit including a capacitor is arranged in a middle of the relay line,
   a length of the relay line is not an integer multiple of a quarter of a microwave wavelength used in the modulation signal, and
   a length of the relay line in a block of each stage is less than a quarter of a microwave wavelength used in the modulation signal.

8. An optical waveguide element module comprising:
   an optical waveguide formed on a substrate;
   an optical waveguide element having a modulation electrode for modulating an optical wave propagating through the optical waveguide;

a connector where an external signal line for inputting a modulation signal into the modulation electrode is connected; and a relay line formed on a relay substrate to connect the connector and the modulation electrode, wherein the relay line is a coplanar-type line, in which a signal electrode is interposed between ground electrodes, an impedance of the relay line changes stepwise so as to suppress reflection of the modulation signal in the optical waveguide element module, a filter circuit including a capacitor is arranged in a middle of the relay line, a length of the relay line is less than half of a microwave wavelength used in the modulation signal, and a length of the relay line in a block of each stage is less than a quarter of a microwave wavelength used in the modulation signal.

* * * * *